(12) United States Patent
Fit-Florea et al.

(10) Patent No.: US 8,060,550 B2
(45) Date of Patent: Nov. 15, 2011

(54) METHOD AND APPARATUS FOR INTEGER TRANSFORMATION USING A DISCRETE LOGARITHM AND MODULAR FACTORIZATION

(75) Inventors: Alexandru Fit-Florea, Palo Alto, CA (US); David W. Matula, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 1131 days.

(21) Appl. No.: 11/535,607

(22) Filed: Sep. 27, 2006

(65) Prior Publication Data

US 2007/0266068 A1 Nov. 15, 2007

Related U.S. Application Data

(60) Provisional application No. 60/721,559, filed on Sep. 27, 2005.

(51) Int. Cl.
G06F 1/02 (2006.01)
G06F 7/00 (2006.01)
G06F 7/38 (2006.01)
G06F 15/00 (2006.01)

(52) U.S. Cl. ......... 708/517; 708/277; 708/491; 708/492

(58) Field of Classification Search .................. 708/277, 708/491, 517
See application file for complete search history.

(56) References Cited

U.S. PATENT DOCUMENTS 4,366,549 A * 12/1982 Katayama .................... 708/625
5,008,849 A * 4/1991 Burgess et al. ............... 708/491
5,923,888 A * 7/1999 Benschop ..................... 713/300
7,171,435 B2 * 1/2007 Allred .......................... 708/277

OTHER PUBLICATIONS

A. Fit-Florea, D.W. Matula, "A Digit-Serial Algorithm for the Discrete Logarithm Modulo 2k", Proceedings of the IEEE 15th International Conference on Application-specific Systems, Architectures, and Processors, IEEE, 2004, pp. 236-246.*

Yi Wan, Chin-Long Wey; "Efficient algorithms for binary logarithmic conversion and addition," Proceedings of the 1998 IEEE International Symposium on Circuits and Systems, vol. 5, pp. 233-236, May 1998.*

Swartzlander, Earl E., et al., "*The Sign/Logarithm Number System*", IEEE Transactions on Computers, vol. C-24, pp. 1238-1242, Dec. 1975.

Arnold, Mark G., et al., "*Applying Features of IEEE 754 to Sign/Logarithm Arithmetic*", IEEE Transactions on Computers, vol. 41, No. 8, pp. 1040-1050, Aug. 1992.

Lewis, David M., "*An Accurate LNS Arithmetic Unit Using Interleaved Memory Function Interpolator*", 1063-6889/93, pp. 2-9, 1993.

(Continued)

*Primary Examiner* — Lewis Bullock, Jr.
*Assistant Examiner* — Matthew Sandifer
(74) *Attorney, Agent, or Firm* — Baker Botts L.L.P.

(57) ABSTRACT

Transforming an integer comprises receiving the integer, where the integer can be expressed as a modular factorization. The modular factorization comprises one or more factors, where each factor has an exponent. The integer is expressed as a product of residues. A discrete logarithm of the integer is established from a sum corresponding to the product of residues. A value for an exponent of a factor is determined from the discrete logarithm. The integer is represented as the modular factorization comprising the one or more factors, where each factor has a value for the exponent.

15 Claims, 3 Drawing Sheets

OTHER PUBLICATIONS

Fit-Florea, Alex., et al., "*A Digit-Serial Algorithm for the Discrete Logarithm Modulo $2^k$*", Proceedings of the 15th IEEE International Conference on Application-Specific Systems, Architectures and Processors, The Computer Society, 11 pages, 2004.

Fit-Florea, A., et al., "*Addition-based exponentiation modulo $2^k$*", Electronics Letters, vol. 41, No. 2, pp. 56-57, Jan. 20, 2005.

Fit-Florea, A., et al., "*Additive bit-serial algorithm for discrete logarithm modulo $2^k$*", Electronics Letters, vol. 41, No. 2, 2 pages, Jan. 20, 2005.

Matula, David W., et al., "*Table Lookup Structures for Multiplicative Inverses Modulo $2^k$,*", Proceedings of the 17th IEEE Symposium on Computer Arithmetic, 8 pages, 2005.

\* cited by examiner

METHOD AND APPARATUS FOR INTEGER TRANSFORMATION USING A DISCRETE LOGARITHM AND MODULAR FACTORIZATION

RELATED APPLICATION

This application claims benefit under 35 U.S.C. §119(e) of U.S. Provisional Application Ser. No. 60/721,559, entitled "Method And Apparatus For Integer Conversion Using The Discrete Logarithm And Modular Factorization," filed Sep. 27, 2005, by Alexandru Fit-Florea, et al.

TECHNICAL FIELD

This invention relates generally to the field of circuits for performing mathematical operations and more specifically to a method and apparatus for integer transformation using a discrete logarithm and modular factorization.

BACKGROUND

A k-bit integer n satisfying $0 \leq n \leq 2^k - 1$ has a modular factorization $n = |(-1)^s 2^p 3^e|_{2^k}$. Integer n may be represented by an exponent representation such as the exponent triple (s,p,e), where $0 \leq s \leq 1$, $0 \leq p \leq k$, and $0 \leq e \leq 2^{k-2} - 1$. A discrete logarithmic system (DLS) may represent integers n by their corresponding exponent triples (s,p,e). By doing this, integer multiplication may be reduced to addition of corresponding terms of the triples.

Known techniques for determining the exponent triple for a k-bit integer involve tables that grow exponentially with respect to k. These tables, however, are of limited use for representation of k-bit integers for $k \geq 16$. Accordingly, these known techniques are not efficient in certain situations.

SUMMARY OF THE DISCLOSURE

According to one embodiment of the present invention, transforming an integer comprises receiving the integer, where the integer can be expressed as a modular factorization. The modular factorization comprises one or more factors, where each factor has an exponent. The integer is expressed as a product of residues. A discrete logarithm of the integer is established from a sum corresponding to the product of residues. A value for an exponent of a factor is determined from the discrete logarithm. The integer is represented as the modular factorization comprising the one or more factors, where each factor has a value for the exponent.

Certain embodiments of the invention may provide one or more technical advantages. A technical advantage of one embodiment may be that the exponent triple for a k-bit integer may be determined in a manner scalable with respect to k. Moreover, the exponent triple may be efficiently determined for $k \geq 16$, such as k=32, 64, or 128.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
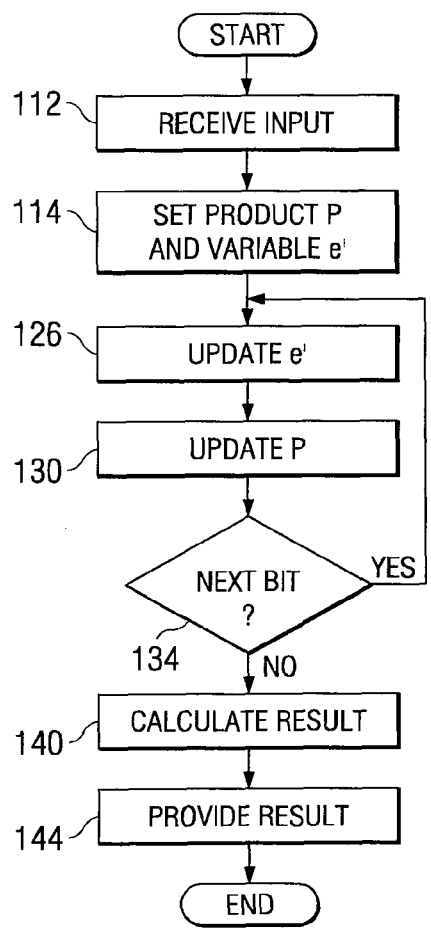
FIG. 1 illustrates an embodiment of a method for performing a transformation to determine a triple (s,p,e) for a given k-bit integer n.
Figure 2:
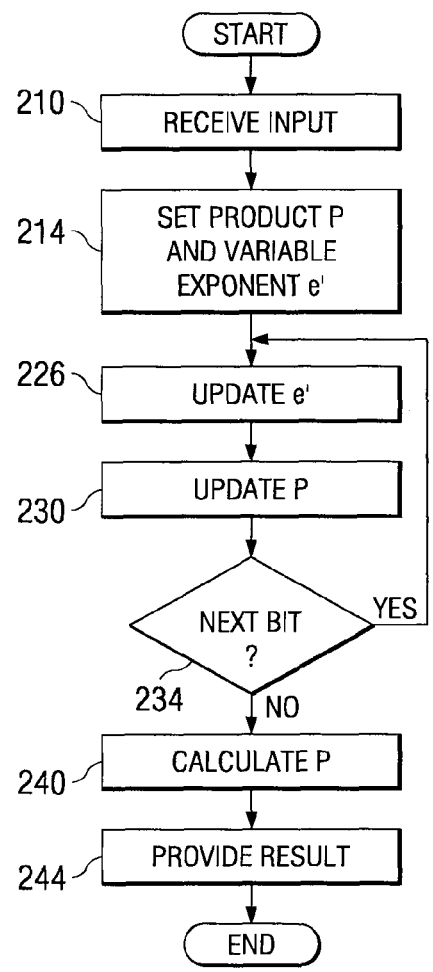
FIG. 2 illustrates an embodiment of a method for performing an inverse transformation to determine a k-bit integer n for a given triple (s,p,e)

FIGS. 1 and 2 illustrate embodiments of methods for transforming between binary and discrete log representations of integers. A k-bit integer n satisfying $0 \leq n \leq 2^k - 1$ has a modular factorization $n = |(-1)^s 2^p 3^e|_{2^k}$. Integer n may be represented by an exponent representation such as the exponent triple (s,p,e), where $0 \leq s \leq 1$, $0 \leq p \leq k$, and $0 \leq e \leq 2^{k-2} - 1$. The exponent triple (s,p,e) may be uniquely specified by further limiting the range of e and s, depending on the value of p. Binary-to-discrete log transformation refers to determining the triple (s,p,e) for a given k-bit integer n, and discrete log-to-binary inverse transformation refers to determining the integer n for a given triple (s,p,e). In one embodiment, a discrete logarithmic system (DLS) may represent integers n by their corresponding exponent triples (s,p,e). By doing this, integer multiplication may be reduced to addition of corresponding terms of the triples.

According to one embodiment, for $0 \leq n \leq 2^k - 1$, p may be determined using a right-shift normalization step, and s may be determined by conditional complementation to obtain a normalized n congruent to 1 or 3 (mod 8). Transformation may then be reduced to determination of the discrete log e=dlg(n) for n congruent to 1 or 3 (mod 8), with $0 \leq e \leq 2^{k-2} - 1$. According to the embodiment, the inverse transformation may then be reduced to evaluating the exponential residue operation to determine $|3^e|_{2^k}$.

FIG. 1 illustrates an embodiment of a method for performing a transformation to determine the triple (s,p,e) for a given k-bit integer n. According to one embodiment, integer n may, if possible, be expressed as a product of a particular set of residues. For example, n may be expressed as a product of two-ones residues: $n = |\Pi(2^i + 1)|_{2^k}$, for selected i's. The discrete logarithm may then be computed as the corresponding sum: $dlg(n) = dlg(\Pi(2^i+1)) = |\Sigma dlg(2^i+1)|_{2^{k-2}}$.

According to one embodiment, integers n that can be expressed as a product of residues may be identified, and the corresponding unique set of two-ones residues may be determined. In one embodiment, the set of two-ones residues may be given by $\{(2^i+1) | 1 \leq i \leq k-1, i \neq 2\}$, and a k-bit odd integer n congruent to 1 or 3 modulo 8 can be expressed as a product of a unique subset of these two-ones residues. For the remaining odd residues corresponding to n congruent with 5 or 7 modulo 8, the additive inverses $|-n|_{2^k}$ are congruent with 1 or 3 modulo 8. A bit serial additive method may then be used to identify the set of two-ones residues.

According to one embodiment, the method transforms an odd k-bit integer $n=\alpha_{k-1}\alpha_{k-2}\ldots\alpha_2\alpha_1\alpha_0$ to the discrete log of n expressed as (s, e), where $n=|(-1)^s 3^e|_{2^k}$. The time complexity may be related to k dependent shift-and-add modulo $2^k$ operations.

For purposes of illustration, an example of the method is provided by lines $L_T 1$ though $L_T 15$ below:

Stimulus: k, $n=\alpha_{k-1}\alpha_{k-2}\ldots\alpha_2\alpha_1\alpha_0$, where $\alpha_0=1$.

Response: discrete log of n, expressed as (s, e), where $n=|(-1)^s 3^e|_{2^k}$.

$L_T 1$: $P := n; |e'|_1 := 0; s := 0;$ $L_T 2$: if $(a_2 = 1)$, then:

$L_T 3$: $\quad s := 1; P := |-P|_{2^k};$ $L_T 4$: fi $L_T 5$: if $|P|_{2^3} = 001$, then:

$L_T 6$: $\quad |e'|_{2^1} := 1;$ $L_T 7$: $\quad P := |P + P \times 2|_{2^k};$ $L_T 8$: fi $L_T 9$: for i from 3 to $(k-1)$, do:

$L_T 10$: $\quad$ if $(p_i = 1)$, where $p_i$ represents the ith bit of P, then:

$L_T 11$: $\quad\quad e' = |e' - dlg(2^i + 1)|_{2^{k-2}};$ $L_T 12$: $\quad\quad P = |P + |P \times 2^j|_{2^k}|_{2^k};$ $L_T 13$: $\quad$ fi;

$L_T 14$: end;

$L_T 15$: Result: (s, e').

Referring to lines $L_T 1$ though $L_T 15$ and FIG. 1, the method starts at step 112, where input is received. The input may comprise an odd k-bit integer $n=\alpha_{k-1}\alpha_{k-2}\ldots\alpha_2\alpha_1\alpha_0$. Product P and variable e' are set at step 114. Product P represents integer n, and variable e' may be given as $|P|_{2^3}=|3^{e'}|_{2^3}$. Product P may be initialized as P:=n, variable e' may be initialized as $|e'|_1:=0$ (which corresponds to $P_2=1$), and exponent s may be initialized as s:=0 (as illustrated at line $L_T 1$).

If n can be expressed as a two-ones residue product, then the sign may be considered. For example, if n is not congruent with 1 or 3 modulo 8, that is, $\alpha_2=1$, then s may be set to s:=1 (as illustrated at lines $L_T 2$-$L_T 3$). The discrete log of the complement $|2^k-n|_{2^k}$ may then be determined to set P:=|–P|$_{2^k}$ (as illustrated at line $L_T 3$). If $|P|_{2^3}$=001, that is, the three low order bits are binary 001, e' may be adjusted according to $|e'|_{2^1}:=1$ to yield e'=1, and product P may be updated according to P:=$|P+P\times 2|_{2^k}$ to yield $P_2=3\times P$ (as illustrated at lines $L_T 5$-$L_T 7$).

Variable e' is updated at step 126. For $p_i=1$, where $p_i$ represents the ith bit of P, variable e' may be updated by subtracting the corresponding values $dlg(2^i+1)$ (which may be obtained from a table) from variable e'. For example, variable e' may be updated according to $e'=|e'-dlg(2^i+1)|_{2^{k-2}}$ (as illustrated at lines $L_T 9$-$L_T 11$). Product P is updated at step 130. Product P may be updated according to $P_{i+1}=P_i\times(2^i+1)$, for $p_i=1$ (as illustrated at line $L_T 12$). For example, product P may be updated according to $P=|P+P\times 2^i|_{2^k}|_{2^k}$. The updating at steps 126 and 130 may be performed concurrently or sequentially in any suitable order.

There may be a next bit to process at step 134. If there is a next bit, the method returns to step 126 to update variable e' for the next bit. If there is no next bit, the method proceeds to step 140.

The result is calculated at step 140. The result may comprise (s, e) (as illustrated at line $L_T 15$). The result is provided at step 144. After providing the result, the method ends.

Modifications, additions, or omissions may be made to the method without departing from the scope of the invention. The method may include more, fewer, or other steps. Additionally, steps may be performed in any suitable order without departing from the scope of the invention.

FIG. 2 illustrates an embodiment of a method for performing an inverse transformation to determine the k-bit integer n for a given exponent triple (s,p,e). According to one embodiment, exponent e may be recoded as a sum of elements $e=|\Sigma\alpha_i|_{2^{k-2}}$. In this embodiment, $|3^e|_{2^k}$ may be computed as $|3^e|_{2^k}=|3^{\Sigma\alpha_i}|_{2^k}$. The $\alpha_i$ and/or corresponding powers $\{3^{\alpha_i}\}$ may be precomputed and available by table lookup. An exponent e may be expressed as a sum of $dlg(2^i+1)$ termed two-ones discrete logs. Moreover, $3^{dlg(2^i+1)}=2^i+1$, so the corresponding multiplications may be performed as a series of shift-and-add operations. To do this, the two-ones discrete logs may be pre-computed and stored in a table, such as a k-entry table indexed by value i for $0\leq i\leq k-1$. TABLE 1 illustrates examples of values that may be stored in a two-ones discrete log table for k=16. The unique set of discrete logs $dlg(2^i+1)$ that have sum modulo $2^{k-2}$ equal to e may be established.

TABLE 1

| | $2^i + 1$ | | $dlg(2^i + 1)$ | |
|---|---|---|---|---|
| i | Binary | Decimal | Binary | Decimal check |
| 0 | 0000 0000 0000 0001 | 1 | 00 0000 0000 0000 | 0 | $|3^0|_{2^{16}} = 1$ |
| 1 | 0000 0000 0000 0011 | 3 | 00 0000 0000 0001 | 1 | $|3^1|_{2^{16}} = 3$ |
| 2 | 0000 0000 0000 0101 | 5 | N/A | N/A | N/A |
| 3 | 0000 0000 0000 1001 | 9 | 00 0000 0000 0010 | 2 | $|3^2|_{2^{16}} = 9$ |
| 4 | 0000 0000 0001 0001 | 17 | 01 1101 1011 0100 | 7604 | $|3^{7604}|_{2^{16}} = 17$ |
| 5 | 0000 0000 0010 0001 | 33 | 11 1110 0010 1000 | 15912 | $|3^{15912}|_{2^{16}} = 33$ |
| 6 | 0000 0000 0100 0001 | 65 | 10 0111 0101 0000 | 10064 | $|3^{10064}|_{2^{16}} = 65$ |
| 7 | 0000 0000 1000 0001 | 129 | 11 1010 1010 0000 | 15008 | $|3^{15008}|_{2^{16}} = 129$ |
| 8 | 0000 0001 0000 0001 | 257 | 10 0101 0100 0000 | 9536 | $|3^{9536}|_{2^{16}} = 257$ |
| 9 | 0000 0010 0000 0001 | 513 | 00 1010 1000 0000 | 2688 | $|3^{2688}|_{2^{16}} = 513$ |
| 10 | 0000 0100 0000 0001 | 1025 | 01 0101 0000 0000 | 5376 | $|3^{5376}|_{2^{16}} = 1025$ |
| 11 | 0000 1000 0000 0001 | 2049 | 10 1010 0000 0000 | 10752 | $|3^{10752}|_{2^{16}} = 2049$ |
| 12 | 0001 0000 0000 0001 | 4097 | 01 0100 0000 0000 | 5120 | $|3^{5120}|_{2^{16}} = 4097$ |
| 13 | 0010 0000 0000 0001 | 8193 | 10 1000 0000 0000 | 10240 | $|3^{10240}|_{2^{16}} = 8193$ |

TABLE 1-continued

| | $2^i + 1$ | | $dlg(2^i + 1)$ | | |
|---|---|---|---|---|---|
| i | Binary | Decimal | Binary | Decimal | check |
| 14 | 0100 0000 0000 0001 | 16385 | 01 0000 0000 0000 | 4096 | $\|3^{4096}\|_{2^{16}} = 16385$ |
| 15 | 1000 0000 0000 0001 | 32769 | 10 0000 0000 0000 | 8192 | $\|3^{8192}\|_{2^{16}} = 32769$ |

Modifications, additions, or omissions may be made to TABLE 1 without departing from the scope of the invention. For example, TABLE 1 may be determined for the discrete logarithmic base $g=\|3^i\|_{2^{k-2}}$ for any odd integer i. TABLE 1 may include more, fewer, or other fields or entries. Additionally, the fields or entries may be organized in any suitable manner without departing from the scope of the invention.

For purposes of illustration, an example of the method is provided by lines $L_{IT}1$ though $L_{IT}15$ below. In the example, bit index i denotes a bit of the standard binary representation.

Stimulus: k, $e=e_{k-3}e_{k-4} \ldots e_2e_1e_0$.
Response: $\|3^e\|_{2^k}$.

$L_{IT}1$: $P := 1; \|e'\|_1 := e;$ $L_{IT}2$: if $(e'_0 = 1)$, then:

$L_{IT}3$:    $(e' := e' - 1); P := 11;$ $L_{IT}4$: fi $L_{IT}5$: for bit index $i$ from 1 to $(k - 3)$, do:

$L_{IT}6$:    if $(e'_i = 1)$, then:

$L_{IT}7$:       $e' := |e' - dlg(2^{i+2} + 1)|_{2^{k-2}};$ $L_{IT}8$:       $P := |P \times (2^{i+2} + 1)|_{2^k};$ $L_{IT}9$:    fi;

$L_{IT}10$: end;

$L_{IT}11$: Result: $P$.

Referring to lines $L_{IT}1$ though $L_{IT}11$ and FIG. 2, the method starts at step 210, where input is received. The input may comprise integer $e=e_{k-3}e_{k-4} \ldots e_2e_1e_0$. Product P and variable e' are set at step 214. Product P represents integer n, and variable e' may be given as $|P|_{2^3}=|3^{e'}|_{2^3}$. Product P may be set to either 1 or 11, corresponding to $e'_0=1$ or $e'_0=0$, respectively (as illustrated at lines $L_{IT}1$-$L_{IT}3$). Variable e' may be set such that, for each iteration, P corresponds to $3^{e-e'}$ and the least significant i bits of e' are 0s.

Variable e' is updated at step 226. Variable e' may be updated by subtracting the corresponding values $dlg(2^{i+2}+1)$ from variable e'. For example, variable e' may be updated according to $e':=|e'-dlg(2^{i+2}+1)|_{2^{k-2}}$ (as illustrated at lines $L_{IT}7$). Product P is updated at step 230. Product P may be updated to reflect the changes in the exponent. For example, product P may be updated according to $P:=|P\times(2^{i+2}+1)|_{2^k}$ (as illustrated at line $L_{IT}8$). The updating at steps 226 and 230 may be performed concurrently or sequentially in any suitable order.

There may be a next bit to process at step 234. If there is a next bit, the method returns to step 226 to update variable e' for the next bit. If there is no next bit, the method proceeds to step 240.

The result is calculated at step 240. The result may comprise P. After (k−2) steps, e' becomes 0 and P corresponds to $|3^{e-0}|_{2^3}=|3^e|_{2^k}$. The values $dlg(2^{i+2}+1)$ may be stored in a lookup table. The table size grows quadratically with k, so the method may be practical for large k=64, 128, . . . . The result is provided at step 244. After providing the result, the method ends.

Modifications, additions, or omissions may be made to the method without departing from the scope of the invention. The method may include more, fewer, or other steps. Additionally, steps may be performed in any suitable order without departing from the scope of the invention.

According to one embodiment, the exponent triple (s,p,e) for a k-bit integer n may be stored as a k-bit string using variable width fields. For $0 \leq n \leq 2^k-1$, the value of p determined by the right-shift normalization satisfies $0 \leq p \leq k-1$. Value p may be represented by the (p+1)-bit value $2^p$ right adjusted in the k-bit field. For $0 \leq p \leq 2^{k-2}$, exponent e satisfies $0 \leq e \leq 2^{k-p-2}-1$. Exponent e may be stored in a (k−p−2)-bit field left adjusted in the k-bit field.

According to the embodiment, the lengths of the fields for e and $2^p$ may be variable. In the embodiment, the lengths of the fields for e and $2^p$ may total (k−1) bits, where a bit between the fields for e and $2^p$ may provide sign bit information. For example, the bit between the fields may be assigned the value ($e_0$ xor s). Accordingly, the length of the e field may be longer and the $2^p$ field may be shorter when more bits are needed to store entries of the e field than to store entries of the $2^p$ field. The length of the $2^p$ field may be longer and the e field may be shorter when more bits are needed to store entries of the $2^p$ field than to store entries of the e field.

According to one embodiment, the one-to-one mapping between 5-bit discrete log numbers comprising a 5-bit discrete log representations and 5-bit integers may be given by TABLE 2.

TABLE 2

| Discrete Log Number System (DLS) Encoding | Partitioned DLS Bit Strings | | | Integer Value $\|(-1)^s 2^p 3^e\|_{32}$ | Standard Binary | Integer Parity |
|---|---|---|---|---|---|---|
| | e | $e_0$ xor s | $2^p$ | | | |
| 00001 | 000 | 0 | 1 | 1 | 00001 | Odd |
| 00011 | 000 | 1 | 1 | 31 | 11111 | |
| 00101 | 001 | 0 | 1 | 29 | 11101 | |
| 00111 | 001 | 1 | 1 | 3 | 00011 | |
| 01001 | 010 | 0 | 1 | 9 | 01001 | |
| 01011 | 010 | 1 | 1 | 23 | 10111 | |

TABLE 2-continued

| Discrete Log Number System (DLS) Encoding | Partitioned DLS Bit Strings | | | Integer Value | Standard | Integer |
|---|---|---|---|---|---|---|
| | e | $e_0$ xor s | $2^p$ | $|(-1)^s 2^p 3^e|_{32}$ | Binary | Parity |
| 01101 | 011 | 0 | 1 | 5 | 00101 | |
| 01111 | 011 | 1 | 1 | 27 | 11011 | |
| 10001 | 100 | 0 | 1 | 17 | 10001 | |
| 10011 | 100 | 1 | 1 | 15 | 01111 | |
| 10101 | 101 | 0 | 1 | 13 | 01101 | |
| 10111 | 101 | 1 | 1 | 19 | 10011 | |
| 11001 | 110 | 0 | 1 | 25 | 11001 | |
| 11011 | 110 | 1 | 1 | 7 | 00111 | |
| 11101 | 111 | 0 | 1 | 21 | 10101 | |
| 11111 | 111 | 1 | 1 | 11 | 01011 | |
| 00010 | 00 | 0 | 10 | 2 | 00010 | Singly Even |
| 00110 | 00 | 1 | 10 | 30 | 11110 | |
| 01010 | 01 | 0 | 10 | 26 | 11010 | |
| 01110 | 01 | 1 | 10 | 6 | 00110 | |
| 10010 | 10 | 0 | 10 | 18 | 10010 | |
| 10110 | 10 | 1 | 10 | 14 | 01110 | |
| 11010 | 11 | 0 | 10 | 10 | 01010 | |
| 11110 | 11 | 1 | 10 | 22 | 10110 | |
| 00100 | 0 | 0 | 100 | 4 | 00100 | Doubly Even |
| 01100 | 0 | 1 | 100 | 28 | 11100 | |
| 10100 | 1 | 0 | 100 | 20 | 10100 | |
| 11100 | 1 | 1 | 100 | 12 | 01100 | |
| 01000 | | 0 | 1000 | 8 | 01000 | Triply Even |
| 11000 | | 1 | 1000 | 24 | 11000 | |
| 10000 | | | 10000 | 16 | 10000 | Quadruply Even |
| 00000 | | | 00000 | 0 | 00000 | Zero |

Modifications, additions, or omissions may be made to TABLE 2 without departing from the scope of the invention. TABLE 2 may include more, fewer, or other fields or entries.

Figure 3:
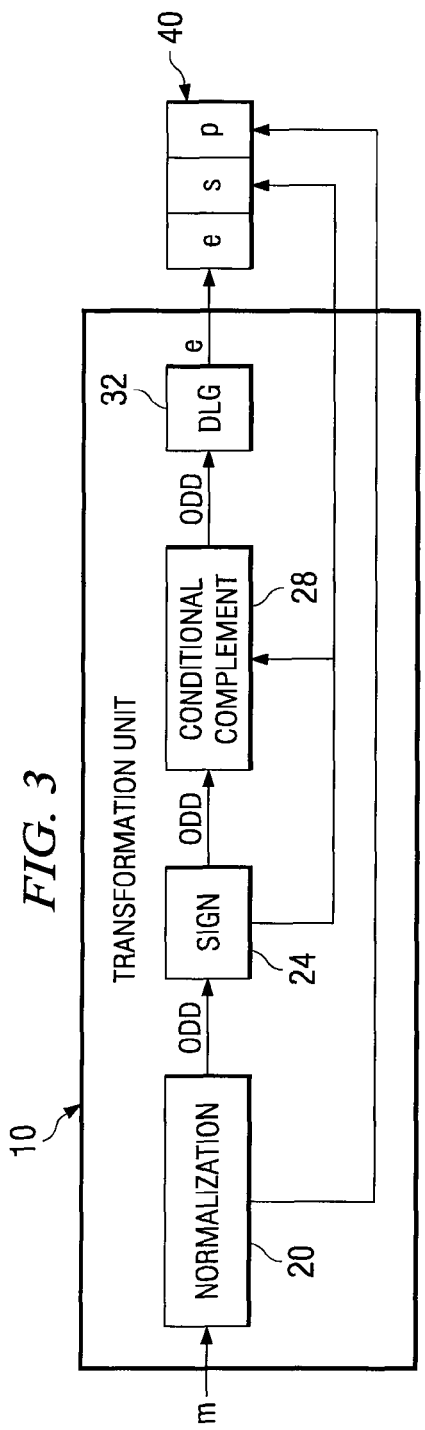
FIG. 3 illustrates one embodiment of a transformation unit that may be used to perform binary-to-discrete log transformation according to the method described with reference to FIG. 1.

FIG. 3 illustrates one embodiment of a transformation unit 10 that may be used to perform binary-to-discrete log transformation according to the method described with reference to FIG. 1. Transformation unit 10 may include one or more elements operable to perform the operations of transformation unit 10, for example, an interface, logic, memory, other suitable element, or any suitable combination of any of the preceding. An interface may receive input for the component, send output from the component, process the input and/or output, perform other suitable operation, or perform any suitable combination of any of the preceding. An interface may comprise one or more ports and/or conversion software.

A memory may store information. A memory may comprise one or more of any of the following: a Random Access Memory (RAM), a Read Only Memory (ROM), a magnetic disk, a Compact Disk (CD), a Digital Video Disk (DVD), a media storage, any other suitable information storage medium, or any suitable combination of any of the preceding.

Logic may process information for the component by receiving input and processing the input to generate output from the input. Logic may include hardware, software, other logic, or any suitable combination of any of the preceding. Certain logic, such as a processor, may manage the operation of a component. Examples of a processor may include one or more computers, one or more microprocessors, one or more applications, other logic operable to manage the operation of a component, or any suitable combination of any of the preceding.

According to the illustrated embodiment, transformation unit 10 is coupled to fields 40 storing values for exponents e, s, and p as illustrated. Transformation unit 10 includes a normalization portion 20, a sign portion 24, a conditional complement portion 28, and a DLG portion 32 coupled as illustrated. According to the embodiment, normalization portion 20 detects whether the operand is even or odd. If the integer is even, p may be established from the truncated trailing zeros. The number of trailing zeros represents the $2^p$ factor. The value of p may also be used as a left-shift amount for the adjustment of the final result in the inverse transformation unit.

Figure 5:
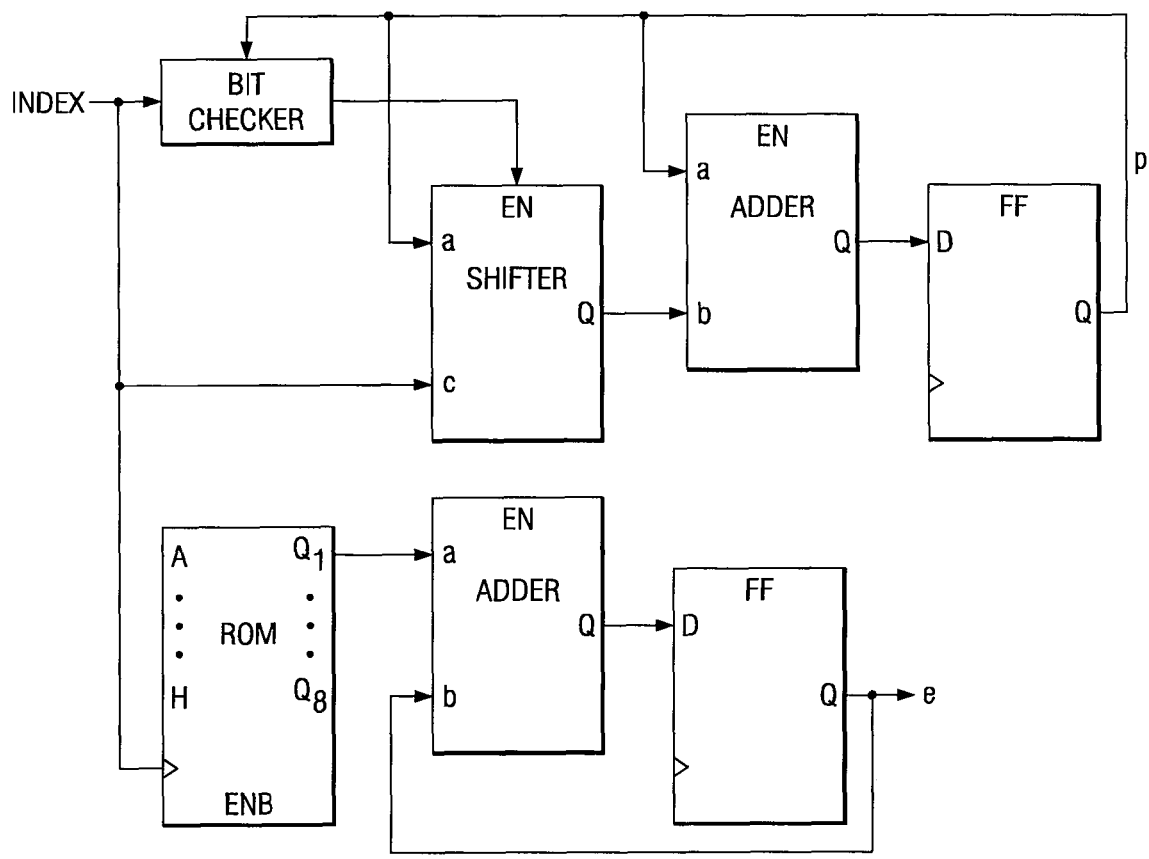
FIG. 5 illustrates one embodiment of a circuit that may be used with the transformation unit of FIG. 3 or the inverse transformation unit of FIG. 4.

Sign portion 24 and conditional complement portion 28 detect the sign bit to establish s. The sign bit may be the third Least Significant Bit (LSB) of the normalized operand. If the sign bit is asserted, conditional complement portion 28 may complement the normalized operand by the input operand. DLG portion 32 accepts the complemented operand and calculates the discrete logarithm to yield e. DLG portion 32 may comprise a shifter and adder circuit and a read-only memory (ROM) lookup table as illustrated in FIG. 5.

Modifications, additions, or omissions may be made to transformation unit 10 without departing from the scope of the invention. The components of transformation unit 10 may be integrated or separated according to particular needs. Moreover, the operations of transformation unit 10 may be performed by more, fewer, or other modules. Additionally, operations of transformation unit 10 may be performed using any suitable logic.

Figure 4:
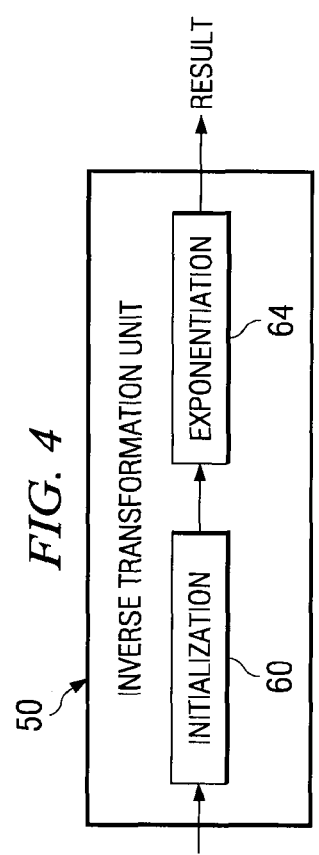
FIG. 4 illustrates one embodiment of an inverse transformation unit that may be used to perform discrete log-to-binary inverse transformation according to the method described with reference to FIG. 2.

FIG. 4 illustrates one embodiment of an inverse transformation unit 50 that may be used to perform discrete log-to-binary inverse transformation according to the method described with reference to FIG. 2. Inverse transformation unit 50 may include one or more elements operable to perform the operations of inverse transformation unit 50, for example, an interface, logic, memory, other suitable element, or any suitable combination of any of the preceding. According to the illustrated embodiment, inverse transformation unit 50 includes an initialization portion 60 and an exponentiation portion 64 coupled as illustrated.

Initialization portion 60 performs initialization procedures, for example, according to lines $L_{IT}1$-$L_{IT}4$. Exponentiation portion 64 calculates exponentiation, for example, according to lines $L_{IT}5$-$L_{IT}10$. According to one embodiment, portions 60 and 64 may be based on shift-and-add modulo $2^k$ operations and may share resources.

Modifications, additions, or omissions may be made to inverse transformation unit 50 without departing from the scope of the invention. The components of inverse transformation unit 50 may be integrated or separated according to particular needs. Moreover, the operations of inverse transformation unit 50 may be performed by more, fewer, or other modules. Additionally, operations of inverse transformation unit 50 may be performed using any suitable logic.

FIG. 5 illustrates one embodiment of a circuit 90 that may be used with transformation unit 10 of FIG. 3 or inverse transformation unit 50 of FIG. 4. As an example, circuit 90 may be used in DLG portion 32 of transformation unit 10. As another example, circuit 90 may be used in exponentiation portion 64 of inverse transformation unit 50.

Modifications, additions, or omissions may be made to circuit 90 without departing from the scope of the invention. The components of circuit 90 may be integrated or separated according to particular needs. Moreover, the operations of circuit 90 may be performed by more, fewer, or other modules. Additionally, operations of circuit 90 may be performed using any suitable logic.

Although this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for transforming an integer using a processor comprising hardware and configured to perform the method, the method comprising:
   receiving a k-bit integer expressible as a modular factorization, the modular factorization comprising one or more factors, each factor having an exponent, wherein one of the factors has a base of 3;
   expressing, by a shifter and a first adder of the processor, the integer as a modulo product of a plurality of residues, a residue being a two-ones residue of the form $(2^i+1)$, wherein i is an integer satisfying $\{1 \leq i \leq k-1, i \neq 2\}$;
   obtaining, by the processor, a discrete log of each of the plurality of residues from a lookup table, wherein the lookup table is indexed by the value i;
   iteratively calculating a modulo sum using the plurality of residue discrete logs in a second adder of the processor;
   establishing, by the processor, a discrete log of the integer from the sum, the sum corresponding to the product of the plurality of residues;
   determining, by the processor, a (k−2) bit value for the exponent of the base-3 factor from the discrete log; and
   representing the integer as the modular factorization comprising the one or more factors, each factor having a value for the exponent.

2. The method of claim 1, wherein a residue of the plurality of residues comprises a value, the value comprising a plurality of digits.

3. The method of claim 1, wherein a residue of the plurality of residues comprises a value, the value comprising a plurality of non-zero digits.

4. The method of claim 1, wherein a residue of the plurality of residues comprises a value, the value comprising a plurality of non-zero digits, the plurality of non-zero digits comprising a unit digit in a least significant position.

5. The method of claim 1, wherein:
   the product of the plurality of residues comprises a product of at most k residues.

6. The method of claim 1, wherein a value of an exponent of a factor comprises a sum corresponding to the product of the plurality of residues.

7. The method of claim 1, wherein a value of an exponent of a factor comprises a first sum corresponding to the product of the plurality of residue discrete logs, the first sum comprising a second sum of a plurality of residues associated with the product of the plurality of residues, the first sum being a modular sum.

8. The method of claim 1, further comprising:
   obtaining the residue discrete logs from a lookup table by looking up values from a least significant bit to a most significant bit.

9. The method of claim 1, further comprising:
   performing the method using dedicated hardware.

10. A method for inverse transforming an integer using a processor comprising hardware and configured to perform the method, the method comprising:
    receiving a (k−2) bit value for an exponent of a factor with a base of 3 of a modular factorization of a k-bit integer, the modular factorization comprising one or more factors, each factor having an exponent;
    partitioning, by a first adder of the processor, the value into a modulo sum of discrete logs of a plurality of residues, a residue being a two-ones residue of the form $(2^i+1)$, wherein i is an integer satisfying $\{0 \leq i \leq k-1, i \neq 2\}$, and wherein the discrete log of each of the plurality of residues is obtained from a lookup table indexed by the value i;
    iteratively calculating, by a shifter and a second adder of the processor, a modulo product of the plurality of residues from the plurality of residue discrete logs obtained from the lookup table; and
    determining, by the rocessor, an integer from the product of the plurality of residues, wherein the integer is the base-3 factor of the modular factorization of the k-bit integer.

11. The method of claim 10, wherein a residue of the plurality of residues comprises a value, the value comprising a plurality of non-zero digits, the plurality of non-zero digits comprising a unit digit in a least significant position.

12. The method of claim 10, wherein:
    the product of the plurality of residues comprises a product of at most k residues.

13. The method of claim 10, further comprising:
    obtaining the residue discrete logs from a lookup table by looking up values from a least significant bit to a most significant bit.

14. The method of claim 10, further comprising:
    performing the method using dedicated hardware.

15. The method of claim 10, further comprising:
    obtaining the residue discrete logs from a lookup table by looking up entries corresponding to values of $2^{i+2}+1$.

* * * * *